United States Patent [19]

Murakoshi

[11] 4,448,510

[45] May 15, 1984

[54] CAMERA SHAKE DETECTION APPARATUS

[75] Inventor: Makoto Murakoshi, Asaka, Japan

[73] Assignee: Fuji Photo Film Co., Ltd., Kanagawa, Japan

[21] Appl. No.: 434,341

[22] Filed: Oct. 14, 1982

[30] Foreign Application Priority Data

Oct. 23, 1981 [JP] Japan .............................. 56-169589

[51] Int. Cl.³ ............................................. G03B 17/18
[52] U.S. Cl. ............................................... 354/289.12
[58] Field of Search ................................. 354/127, 289

[56] References Cited

PUBLICATIONS

"Micromechanical Accelerometer Integrated With MOS Detection Circuitry", by Kurt Peterson et al., *Dec. 1980, International Electron Device Meeting (IEDM),* pp. 673-675.

*Primary Examiner*—Michael L. Gellner

*Attorney, Agent, or Firm*—Birch, Stewart, Kolasch & Birch

[57] ABSTRACT

An apparatus for detecting camera shaking includes an accelerometer mounted in a camera for sensing acceleration to produce an electrical signal representative of the acceleration sensed, an alarm indicator for indicating an alarm, and control circuitry connected to the accelerometer for comparing the electrical signal with a threshold level. The control circuitry is operative in response to release of a shutter of the camera to enable the alarm indicator when the electrical signal exceeds the threshold level. The indicator thereby indicates the possibility of blur due to shaking of the camera in an image taken.

For the accelerometer, a micromechanical acceleration sensor may be used, in which changes in electrostatic capacitance caused by acceleration applied are derived in the form of electrical signals.

20 Claims, 14 Drawing Figures

→ TIME

CAMERA SHAKE DETECTION APPARATUS

BACKGROUND OF THE INVENTION

1. Field of the Invention

The present invention relates to apparatus for detecting camera shaking, and, more specifically, to apparatus for detecting shaking of a still camera, such as a silver salt photography camera and an electronic camera, which, for example, has a solid state imaging device which produce video signals associated with an image formed thereon and records the video signals on a magnetic recording medium, to produce an alarm indication when taking a picture.

2. Description of the Prior Art

With a conventional camera, particularly a still camera, blur is likely to occur due to shaking of a camera when imaging at a lower shutter speed. Blur due to shaking has a greater effect on decreasing image quality than does failure of focusing. It was often difficult for a user of the camera to know, when having taken a picture, whether or not blur due to shaking occurred during the image picked up. If the user could know that such blur had occurred immediately after having taken a picture, the user could release the shutter again so as not to miss an important scene. However, a camera shake detector apparatus which may be mounted in an appropriate size for use in a camera and detect shaking action at a higher sensitivity has never been proposed. In addition, many functions necessary for a camera are recently accomplished in integrated circuitry, and it is therefore required to provide a camera shake detector apparatus that is well fit and applicable to electronics to be mounted in a camera with a high packing density and an increased reliability.

SUMMARY OF THE INVENTION

It is therefore an object of the present invention to provide a camera shake detection apparatus for detecting a camera shaking with a higher sensitivity while mountable in a camera of small size integral with other electronics for the camera.

In accordance with the present invention, the object is accomplished by apparatus for detecting shaking of a camera which includes acceleration sensor means mounted in a camera for sensing acceleration due to shaking of the camera to produce an electrical signal associated with the acceleration sensed, alarm indicator means for indicating an alarm, and an alarm control circuit connected to the acceleration sensor means for comparing the electrical signal in level with a threshold, the alarm control circuit being operative in response to releasing of a shutter of the camera to enable the alarm indicator means when the electrical signal exceeds the threshold, whereby the alarm indicator means indicates an alarm representative of the possibility of blur occurring in an image taken by the camera.

In an aspect of the invention, said acceleration sensor means may include a micromechanical acceleration sensor in which electrostatic capacitance is variable in response to acceleration applied thereto.

BRIEF DESCRIPTION OF THE DRAWINGS

A better understanding of the present invention may be made from a consideration of the following detailed description taken in conjunction with the accompanying drawings in which.

DESCRIPTION OF THE PREFERRED EMBODIMENTS

In the present specification, the words "micromechanical acceleration sensor" or "micromechanical accelerometer" are directed to a sensor which has a cantilever formed integral with an integrated electronics circuit and senses acceleration in terms of electrostatic capacitance varying in response to acceleration caused by mechanical vibration or shaking with respect to the cantilever by utilizing the inertia thereof, as discussed later. For this purpose, a metal oxide semiconductor (MOS) structure may be utilized which has a cantilever formed thereon with the thickness of about 100 $\mu$m, for example, see a conference paper, "Micromechanical Accelerometer Integrated with MOS Detection Circuitry" by Kurt Peterson, et al., *December,* 1980 *International Electron Device Meeting* (IEDM), pp. 673-675.

Figure 1:
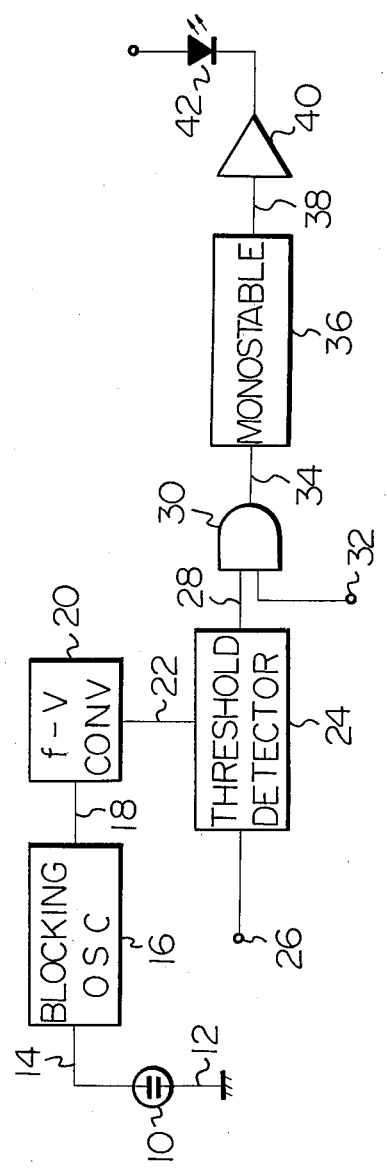
FIG. 1 is a schematic block diagram showing an embodiment of camera shake detection apparatus in accordance with the present invention.

Now with reference to FIG. 1, there is shown an embodiment of an apparatus for detecting a camera shaking in accordance with the present invention in a schematic block diagram. In the figure, the apparatus includes an acceleration sensor or accelerometer 10 which has one terminal 12 grounded and the other terminal 14 connected to a control terminal of a blocking oscillator 16.

Figure 2:
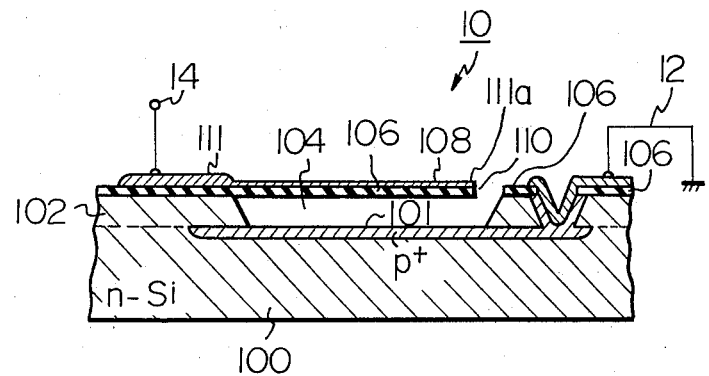
FIG. 2 shows in cross section the structure of an example of an acceleration sensor included in the apparatus shown in FIG. 1.

Acceleration sensor 10 may advantageously be a so-called "micromechanical acceleration sensor" which is formed in integral with a metal oxide semiconductor (MOS) electronics integrated circuit, such as of the structure shown in FIG. 2. Such a micromechanical accelerometer 10 has an epitaxial layer 102 deposited on an n-type silicon (n-Si) substrate 100, which has a local p+ area doped with boron B. Over a shallow recess or groove 104 cut by etching the epitaxial layer 102, a cantilever 110 is formed with one end 111 thereof supported on epitaxial layer 102. Cantilever 110 includes in this example a layer 106 of silicon dioxide $SiO_2$ and a layer 108 of Cr-Au alloy.

When the entire structure of the device 10 shakes or moves quickly up and down, for example, in FIG. 2, cantilever 110 then remains still due to its inertia so that the distance between lever 110 and p+ layer 101 in space 104 changes correspondingly. Such changes in distance between lever 110 and layer 101 may be sensed in terms of corresponding changes in electrostatic capacitance between electrodes 12 and 14. In accordance with one example, cantilever 110 is approximately 105 $\mu$m long, 25 $\mu$m wide and 0.5 $\mu$m thick, and may advantageously be integrated with other electronics, such as a detector circuit, because of its MOS integrated circuit structure. Additionally, in order to increase sensitivity with respect to acceleration of the device 10, a mass of gold Au, for example, may be formed on the other end 111a of lever 110.

Figure 7:
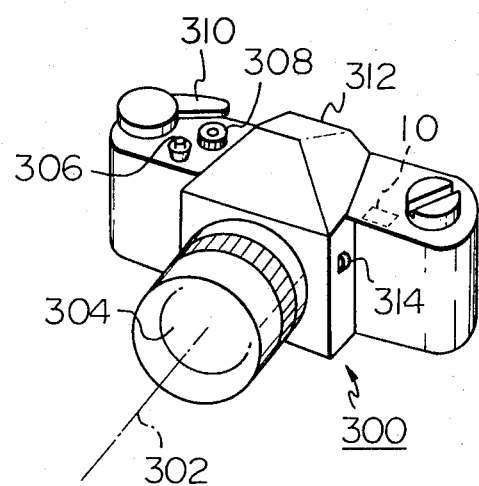
FIG. 7 is a perspective view showing an example of a single reflex camera to which the present invention is applicable.

Such an accelerometer 10 may advantageously be mounted in a camera, which may be a still camera, such as a single-lens reflex camera 300, FIG. 7, in such a manner that accelerometer 10 responds most sensitively to acceleration that is most likely due to a releasing action of the shutter thereof, not shown, to take a picture. In the case of a single-lens reflex camera 300, for example, accelerometer 10 may advantageously be mounted so as to be most sensitive to shaking which may occur generally up and down in the direction substantially perpendicular to the optical axis 302 of the imaging lens 304 thereof, as shown in FIG. 7. In the case of a small-sized camera of the type of which the frame of enclosure is generally of a rectangular parallelepiped box with its principal surfaces generally parallel with the optical axis of the imaging lens, and, when taking a photograph, held by hands from up and down, accelerometer 10 may advantageously be mounted in the camera so as to be most sensitive to shaking due to a rotating action in a plane substantially perpendicular to the optical axis of the lens. In addition to one accelerometer 10 thus mounted in the most sensitive direction in the camera, one or more accelerometers 10 may advantageously be mounted in the camera in such a manner that they are sensitive to shaking actions possibly occurring in other one or more directions or dimentions with respect to the optical axis.

Figure 3:
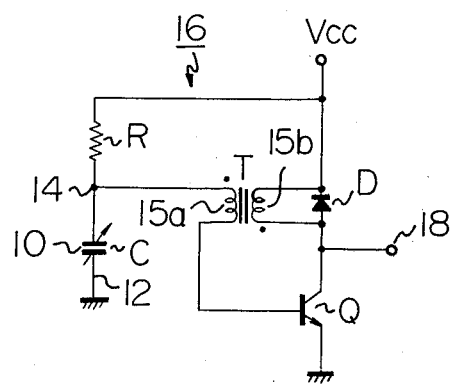
FIG. 3 depicts schematically the circuitry of an example of a blocking oscillator employed in the arrangement illustrated in FIG. 1.

Blocking oscillator 16 may include a pulse transformer T, a transistor Q, a diode D and a resistor R which are interconnected as depicted in FIG. 3, for example. FIG. 3 also illustrates the acceleration sensor or accelerometer 10, which functions as a capacitor C with its capacitance variable in response to mechanical shaking action of device 10, and has one electrode contact 12 grounded and the other electrode contact 14 coupled to the connection between one terminal of resistor R and one terminal of one winding 15a, as shown. Oscillator 16 produces on its output 18 a sequence of pulses of which the repetition rate or pulse interval is variable in response to capacitance C varying. In accordance with the present invention, since it is advantageous to design oscillator 16 so as to produce a sequence of pulses, or a frequency signal, with its pulse interval or repetition rate changeable in response to capacitance C of accelerometer 10, other circuitry may be substituted therefor, such as an astable multivibrator, which accomplishes such functions.

Blocking oscillator 16 has an output 18 connected to a frequency-to-voltage (f-V) converter or frequency discriminator 20, which has a voltage output 22 coupled to a threshold detector or comparator 24, that may be a Schmitt trigger circuit. Threshold detector 24 has a control terminal 26, which receives an input signal for controlling adjustment of a threshold level $V_{th}$, FIG. 4A, of threshold detector 24. The input signal on control terminal 26 may, for example, be an exposure time signal which is representative of an exposure period of time set in camera 300 by means of a shutter speed dial 308, FIG. 7. For example, when a longer exposure time is set in the camera 300 for example, threshold detector 24 operates in response to the control signal on lead 26 to decrease or lower the threshold level $V_{th}$ thereof, while when a shorter exposure time is set, then it operates to increase the level $V_{th}$.

Threshold detector 24 has an output 28 interconnected to one input of AND gate 30, which has another input 32 for receiving a signal that is timed or synchronized with the opening and closing operations of the shutter, not shown, of the camera 300. AND gate 30 has an output 34 coupled to a trigger input of a monostable circuit 36, which is operative in response to output 34 from AND gate 30, when enabled, to produce a high level signal on its output 38 for a predetermined period of time, e.g. one second. For monostable 36, a bistable circuit or flip-flop may be substituted which is adapted to receive a reset signal therefor, which may, for example, be a film windup or feeding signal representative of operations of a film windup or feeding lever 310 of the camera 300.

Monostable multivibrator 36 has an output 38 connected via a driver circuit 40 to an alarm indicator 42, which may include a light emitting diode. Such an indicator 42 may be a visual one, such as a light emitting diode, provided in a viewing field of a view finder 312 of the camera 300 for producing a visible alarm indication, and additionally or alternatively be an audible one such as an audible sound generator using a piezoelectric device for generating audible sound.

Figure 4A:
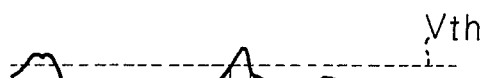
FIGS. 4A-4H show waveforms appearing in the arrangement shown in FIG. 1 and useful for understanding the operations thereof.

With reference to FIGS. 4A–4H, operations will be described on the arrangement shown in FIG. 1. When one carries by hands the camera 300 in which the arrangement shown in FIG. 1 is mounted to release the shutter by actuating shutter button 306, f-V converter 20 produces on its output 22 a voltage signal as shown in FIG. 4A in waveform. The voltage waveform is associated with capacitance changing of accelerometer 10, and thus representative of acceleration applied to the camera.

Figure 4B:
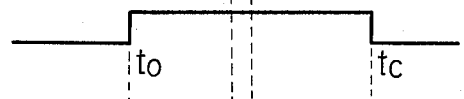
Figure 4C:
Figure 4D:
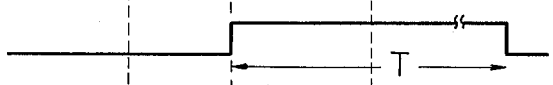

Supposing that a threshold of threshold detector 24 is set to the level $V_{th}$, as shown in FIG. 4A, by an exposure time signal on lead 26 indicative of an exposure time of the camera 300, detector 24 develops a high level at its output 28 only during the period between time points $t_1$ and $t_2$, between which output 22 from f-V converter 20 exceeds the threshold level $V_{th}$, see FIG. 4C. If the shutter, not shown, of the camera 300 opens during the period of time between $t_0$ and $t_c$, in the case of a focal plane shutter, for example, the leading curtain of the shutter runs first at time point $t_0$ and then the trailing curtain runs at time point $t_c$, then AND gate 30 receives on its input 32 a rectangular waveform as shown in FIG. 4B. AND gate 30, in turn, produces a high level output signal on its output 34 during the period $t_1$ through $t_2$ to set monostable multivibrator 36. Monostable multivibrator then produces a high level signal on its output 38 during a predetermined period of time T, e.g. one second, beginning at time $t_1$, see FIG. 4D, to enable driver circuit 40 to drive light emitting diode 42. Visual alarm is thus indicated in the view finder 312 of the camera 300 to make the user notice the possibility of shaking which may have caused blur in an image taken by the camera 300.

By the way, it is strongly dependent upon the length of an exposure period of time and the magnitude of acceleration caused by shaking of the camera 300.

In the illustrated embodiment as discussed above, threshold detector 24 is designed to increase or decrease its threshold $V_{th}$ for comparison with a voltage level on lead 22 from f-V converter 20, in response to a control signal provided on lead 26 and associated with an exposure period of time determined by releasing operation of the shutter, so that level $V_{th}$ is set higher with a shorter exposure time. i.e. higher shutter speed, and is set lower with a longer exposure time, i.e. lower shutter speed. The extent of the variations of the threshold level $V_{th}$ is settable in threshold detector 24 in such a manner that detector 24 produces a high level signal on its output 28 only when acceleration sensor 10 senses acceleration of a magnitude larger than that which would cause blur in an image taken in association with an exposure period of time. Accordingly, the user of the camera 300 employing the arrangement in accordance with the invention will be aware, from an illumination of light emitting diode 42, of the fact that the image just taken by the camera 300 may have blur due to shaking.

If an indication of shaking is not required by the user of the camera 300, the arrangement may include a button 314, FIG. 7, which causes, when actuated, a signal to be provided on control terminal 26 of threshold detector 24, in response to which signal threshold detector 24 brings its threshold $V_{th}$ to its maximum value so as to maintain its output 28 low in level in any case. Altenatively, in such a case, a three-input AND gate may be substituted for the two-input AND gate 30 with its third input port adapted to be enabled only when a shake alarm indication is necessary.

Figure 5:
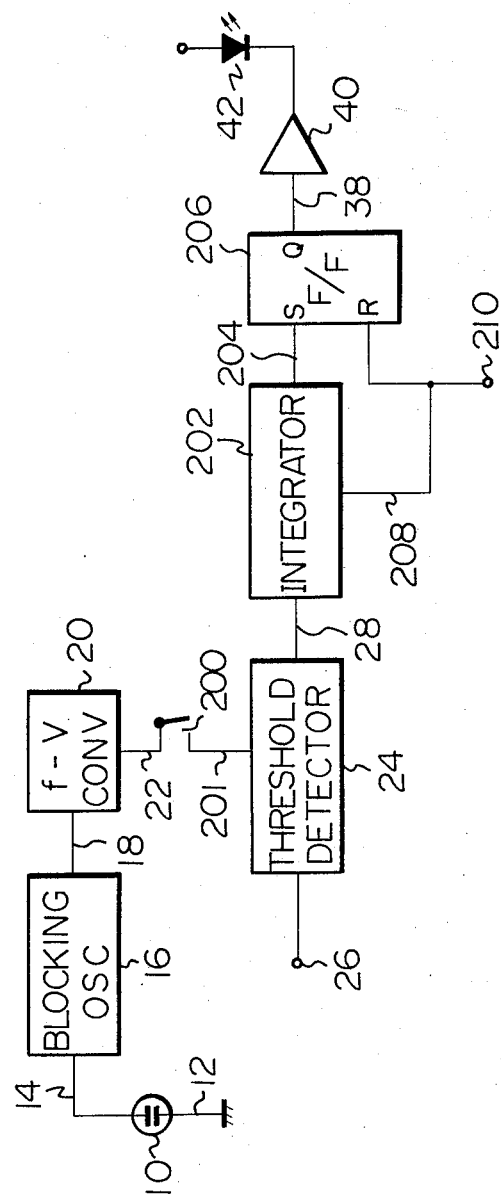
FIGS. 5 and 6 show in schematic block diagrams other embodiments of camera shake detection apparatus in accordance with the invention.

FIG. 5 shows another embodiment of camera shake detection apparatus in accordance with the present invention in a schematic block diagram, in which like constituent elements in FIG. 1 are designated by the same reference numerals, with redundant descriptions thereof not being repeated. In FIG. 5, output 22 from f-V converter 20 is connected via a normally open contact 200 to the input 201 to threshold detector 24. Contact 200 may be a mechanical contact which is operable in response to the shutter of the camera 300 opening and closing as depicted in FIG. 4B. Contact 200, which is symbolized by a mechanical "make" contact in the figure, may be substituted by other gating means for gating analog signals produced from f-V converter 20.

The output 28 from threshold detector 24 is coupled to the input to an integrator 202, which has an output 204 connected of an set input S of a flip-flop 206. Flip-flop 206 has a Q output connected to input 38 of driver circuit 40. A reset input 208 of integrator 202 and a reset input R of flip-flop 206 are connected in common to an input port 210, which receives a film feeding signal associated with a winding operation of film by means of a film winding lever 310 of the camera 300, for example. Alternatively, flip-flop 206 may be substituted by a monostable circuit, such as designated by reference numeral 36 in FIG. 1. In the latter case, the monostable circuit is so connected as to disable light emitting diode 42 and reset integrator 208 after a predetermined period T, FIG. 4D, has passed.

Figure 4E:

In the embodiment shown in FIG. 5, the voltage waveforms, FIG. 4A, indicative of acceleration sensed by sensor 10 is fed from output 22 of f-V converter 20 to threshold detector 24 only during the period of time from $t_0$ to $t_c$, FIG. 4B, which corresponds to an exposure time. Detector 24 produces a high level output for the period between $t_1$ and $t_2$, FIG. 4C, in which the output voltage from converter 20 exceeds the threshold level $V_{th}$. Integrator 202 receives the high level output from the detector 24 on lead 28 to integrate the output with respect to time points $t_1$ through $t_2$ to produce its resultant output on lead 204, which output is shown in FIG. 4E. The output from integrator 202 exceeds the setting threshold level for input S of flip-flop 206 at time $t_3$, FIG. 4F, so that flip-flop 206 is set to its set state to produce a high level output on its Q output. Light emitting diode 42 will in turn be energized by driver 40. The energized state of the light emitting diode 42 will continue until integrator 202 and flip-flop 206 are reset at time $t_5$, FIG. 4E, in response to a high level signal provided on lead 210 by winding operation of the film wind up lever 310 of the camera 300, in the illustrative embodiments.

Figure 4F:
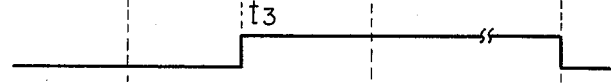

For integrator 202 and flip-flop 206, a digital counter for counting clocks and a decoder for decoding a predetermined count in the counter may be substituted to constitute a timing control circuit for determining whether or not the high level output from threshold detector 24 continues over a predetermined period of time, $t_1-t_3$, FIG. 4F.

Figure 6:
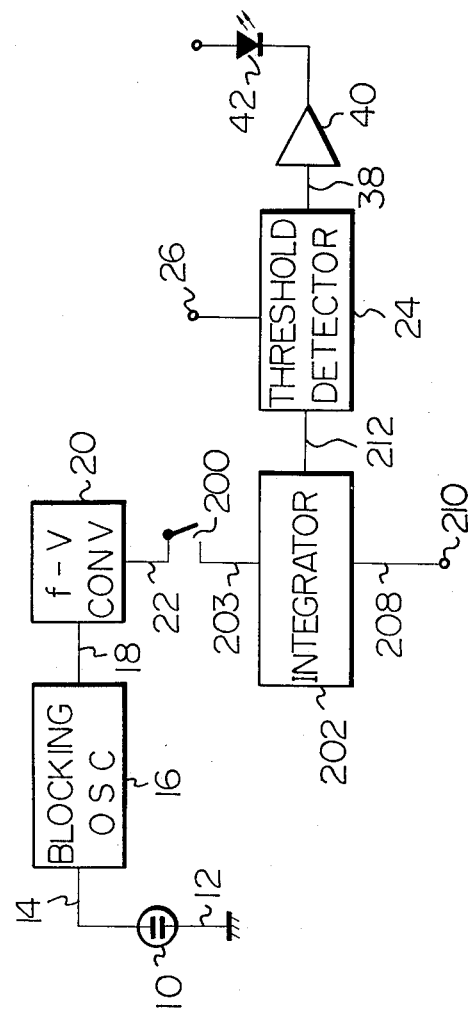

FIG. 6 shows further embodiment of camera shake detection apparatus in accordance with the present invention. The embodiment shown in FIG. 6 is the same as shown in FIG. 5 except that integrator 202 and threshold detector 24 are interchanged in position with each other and flip-flop 206 is not included in the embodiment shown in FIG. 6. As shown in the figure, output 22 from f-V converter 20 is interconnected by way of contact 200 to input 203 to integrator 202, the output 212 of which is coupled to the input of threshold detector 24. The output from threshold detector 24 is coupled to input 38 of driver circuit 40.

Figure 4G:
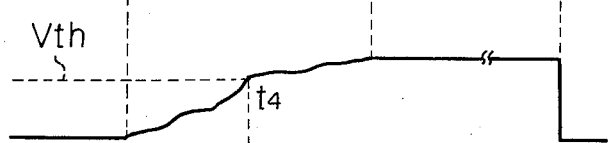
Figure 4H:

In operation, contact 200 closes at time $t_0$ upon releasing the shutter of the camera 300 and opens at time $t_c$, causing integrator 202 to integrate the voltage waveform, FIG. 4A, on output 22 from f-V converter 20 with respect to the time period $t_0$ through $t_c$. FIG. 4G shows an example of the output waveform on output 212 of integrator 202. When the integrated waveform produced on lead 212 exceeds the threshold level $V_{th}$ of threshold detector 24 at time $t_4$, FIG. 4G, detector 24 produces a high level output on lead 38 to actuate driver 40, FIG. 4H. Light emitting diode 42 illuminates in turn to indicate in the view finder 312 of the camera 300 the possibility of blur due to shaking involved in image capture. The alarm may continue until the film is wound up to the next frame at time $t_5$, FIG. 4E, for example.

In theory, the amount of shaking action causing blur to appear in an image taken is dependent upon the positions and amount of shaking movement of the camera, so that it is obtained by integrating twice the sensed acceleration. In practice, however, it is difficult to execute integrations twice on acceleration for a single shot to get exact data on the shaking in question. Therefore, acceleration, or velocity resultant from a single integration on the acceleration is so correlated to the amount of shaking movement as to be used for estimation of blur in an image.

In the illustrative embodiments of the present invention, small-sized acceleration sensors or accelerometers are employed which may be manufactured by using techniques of fabrication of semiconductor integrated circuits, and may therefore be integrated on the same substrate as other electronics associated with a camera on which the accelerometer is mounted. Camera shaking detection apparatus in accordance with the invention is advantageously applicable to a so-called electronics camera, which records on a magnetic recording medium, for example, video signals indicative of an image taken by a solid state image sensor, for example. In that case, the directions and components of shaking of the camera sensed and detected by the apparatus may be recorded on a magnetic recording medium together with video signals, in order to effectively be used for correction of blur in an image, for example, when processed afterwards by an image processor.

While there have been shown and described above illustrative embodiments of camera shake detection apparatus in accordance with the present invention, it will be appreciated that the invention is not specifically limited thereto. Accordingly, all variations, modifications and equivalent arrangements within the scope of the appended claims should be considered within the scope of the invention.

What is claimed is:

1. Apparatus for detecting a camera shaking comprising:
    acceleration sensing means mounted in the camera for sensing acceleration due to shaking of the camera to produce an electrical signal associated with the acceleration sensed;
    alarm indicator means for indicating an alarm; and
    control circuit means connected to said acceleration sensing means for comparing the electrical signal with a threshold signal level, said control circuit means being operative in response to releasing of a shutter of the camera to enable said alarm indicator means when the electrical signal exceeds the threshold, whereby said alarm indicator means indicates an alarm representative of the possibility of blur occurring due to shaking of the camera in an image taken by the camera.

2. Apparatus in accordance with claim 1, wherein said acceleration sensing means comprises aa micromechanical accelerometer which has an electrostatic capacitance changeable in response to acceleration applied thereto.

3. Apparatus in accordance with claim 2, wherein said acceleration sensing means comprises an oscillator circuit connected to said micromechanical accelerometer for producing a frequency signal having a frequency associated with the capacitance of said accelerometer, and a frequency discriminator circuit operative in response to the frequency signal for producing the electrical signal associated with the frequency signal.

4. Apparatus in accordance with claim 1 or 2, wherein said control circuit means adjusts the threshold signal level in response to an exposure time signal representative of an exposure period of time, said threshold being increased in response to the exposure time signal representing a shorter exposure time, and being decreased in response to the exposure time signal representing a longer exposure time.

5. Apparatus in accordance with claim 1 or 2, wherein said control circuit means comprises a monostable circuit responsive to the electrical signal exceeding the threshold for defining a period of time for which said alarm indicator means is enabled by said control circuitry.

6. Apparatus in accordance with claim 1 or 2, wherein said control circuitry is adapted to disable said alarm indicator means in response to a film feeding signal provided in response to a feeding operation of film.

7. Apparatus in accordance with claim 1 or 2, wherein said alarm indicator means comprises a visual indicator provided in a view finder of the camera.

8. Apparatus for detecting a camera shaking comprising:
    acceleration sensing means mounted in the camera for sensing acceleration due to shaking of the camera to produce an electrical signal associated with the acceleration sensed;
    alarm indicator means for indicating alarm;
    first threshold circuit means connected to said acceleration sensing means for comparing the level of said electrical signal in level with a first threshold signal level, said first threshold circuit means being operative in response to a release signal indicative of the release of a shutter of the camera to produce a first signal when the level of said electrical signal exceeds the first threshold signal level; and
    an alarm control circuit means for enabling said alarm indicator means when the first signal continues to be provided for a predetermined period of time, whereby said alarm indicator means indicates an alarm representative of the possibility of blur occurring due to shaking of the camera in an image taken by the camera.

9. Apparatus in accordance with claim 8, wherein said acceleration sensing means comprises a micromechanical accelerometer which has an electrostatic capacitance changeable in response to acceleration applied thereto.

10. Apparatus in accordance with claim 8 or 9, wherein said alarm control circuit means comprises first integrator circuit means for integrating the first signal with respect to time to produce a second signal, and means second threshold circuit means for comparing the level of said second signal with a second threshold signal level, said second threshold circuit means enabling said alarm indicator means when the level of said second signal exceeds the second threshold signal level.

11. Apparatus in accordance with claim 8 or 9, wherein said first threshold circuit means adjusts the first threshold signal level in response to an exposure time signal representative of an exposure period of time, said first threshold signal level being increased in response to the exposure time signal representing a shorter exposure time, and being decreased in response to the exposure time signal representing a longer exposure time.

12. Apparatus in accordance with claim 8 or 9, wherein said alarm control circuit means comprises a first integrator circuit means for integrating the first signal with respect to time to produce a second signal, and a monostable circuit means responsive to the second signal for defining a period of time for which said alarm indicator means is enabled by said alarm control circuit means.

13. Apparatus in accordance with claim 8 or 9, wherein said alarm control circuit means disables said alarm indicator means in response to a film feeding signal provided in response to a feeding operation of film.

14. Apparatus in accordance with claim 8 or 9, wherein said alarm indicator means comprises a visual indicator provided in a view finder of the camera.

15. Apparatus for detecting a camera shaking comprising:
    acceleration sensing means supported in the camera for sensing acceleration due to shaking of the camera to produce an electrical signal associated with the acceleration sensed;

alarm indicator means for indicating an alarm;

integrator circuit means for integrating the electrical signal with respect to time in response to a release signal indicative of a shutter releasing of the camera to produce a first signal; and threshold circuit means connected to said integrator circuit for comparing level of said the first signal with threshold signal levels, said threshold circuit means enabling said alarm indicator means in response to the level of said first signal exceeding the threshold signal level, whereby said alarm indicator means indicates an alarm representative of the possibility of blur occurring due to shaking of the camera in an image taken by the camera.

16. Apparatus in accordance with claim 15, wherein said acceleration sensing means comprising a micromechanical accelerometer which has an electrostatic capacitance changeable in response to acceleration applied thereto.

17. Apparatus in accordance with claim 15 or 16, wherein said threshold circuitry means adjusts the threshold signal level in response to an exposure time signal representative of an exposure period of time, said threshold signal level being increased in response to the exposure time signal representing a shorter exposure time, and being decreased in response to the exposure time signal representing a longer exposure time.

sentative of an exposure period of time, said threshold being increased in response to the exposure time signal representing a shorter exposure time, and being decreased in response to the exposure time signal representing a longer exposure time.

18. Apparatus in accordance with claim 15 or 16, wherein said threshold circuit means comprises a monostable circuit responsive to the level of said first signal exceeding the threshold signal level for defining a period of time for which said alarm indicator means is enabled by said threshold circuitry circuit means.

19. Apparatus in accordance with claim 15 or 16, wherein said control circuitry is adapted to disable said alarm indicator means in response to a film feeding signal provided in response to a feeding operation of film.

20. Apparatus in accordance with claim 15 or 16, wherein said alarm indicator means comprises a visual indicator provided in a view finder of the camera.

* * * * *